(12) United States Patent
Haak et al.

(10) Patent No.: US 12,511,611 B2
(45) Date of Patent: Dec. 30, 2025

(54) INVENTORY TRACKING (71) Applicant: Nedap N.V., Groenlo (NL)

(72) Inventors: Danny Jacobus Theodorus Haak, Enschede (NL); Paul Jasper Compaijen, Deventer (NL)

(73) Assignee: Nedap N.V., Groenlo (NL)

( * ) Notice: Subject to any disclaimer, the term of this patent is extended or adjusted under 35 U.S.C. 154(b) by 377 days.

(21) Appl. No.: 17/388,276

(22) Filed: Jul. 29, 2021

(65) Prior Publication Data

US 2022/0044191 A1 Feb. 10, 2022

(30) Foreign Application Priority Data

Aug. 7, 2020 (NL) ...................................... 2026234

(51) Int. Cl.
*G06Q 10/087* (2023.01)
*G06K 7/10* (2006.01)
*H04B 5/45* (2024.01)

(52) U.S. Cl.
CPC ....... *G06Q 10/087* (2013.01); *G06K 7/10099* (2013.01); *G06K 7/10346* (2013.01); *G06K 7/10435* (2013.01); *H04B 5/45* (2024.01)

(58) Field of Classification Search
CPC .......................... G06Q 10/087; G06K 7/10099
See application file for complete search history.

(56) References Cited

U.S. PATENT DOCUMENTS

2010/0289623 A1\* 11/2010 Roesner ............. G06K 7/10435
340/10.3
2018/0165564 A1\* 6/2018 Springer ................... H04B 5/77
2019/0325173 A1\* 10/2019 Tingler ............. G06K 7/10356

FOREIGN PATENT DOCUMENTS

EP 3333754 A1 6/2018

OTHER PUBLICATIONS

Alain Edwards et al., "Investigation of RFID Based Localization for SmartDrive Vehicular Network Testbed," IEEE, Florida Atlantic University, Depart of Computer and Electrical Engineering and Computer Science, © 2016 (6 pages).
GS1 EPCglobal Inc., "EPC™ Radio-Frequency Identity Protocols Generation-2 UHF RFID," Specification for RFID Air Interface, Protocol for Communications at 860 MHz-960 MHz, Version 2.0.0 Ratified, © 2004 (152 pages).
European Patent Office, Examination Report in corresponding European Patent Application No. 21190140.0 dated Apr. 26, 2023.

\* cited by examiner

*Primary Examiner* — Benyam Haile
(74) *Attorney, Agent, or Firm* — Leydig, Voit & Mayer, Ltd.

(57) ABSTRACT

An inventory system is provided herein, comprising a first inventory system unit and a second inventory system unit. The first inventory system unit comprises at least a configuration transmitter to generate a configuration field inside a first field zone to configure one or more UHF RFID tags within said first field zone into a configured state deviating from a default state. The second inventory system unit therein comprises at least an interrogation transceiver to generate an interrogation field inside a second field zone that is at least partly outside said first field zone to subsequently interrogate a set of one or more UHF RFID tags that are within said second field zone and that are in the configured state as a result of being configured by the configuration transmitter.

19 Claims, 7 Drawing Sheets

INVENTORY TRACKING

CROSS-REFERENCE TO RELATED APPLICATIONS

This patent application claims priority to Netherlands Application No. 2026234, filed Aug. 7, 2020, the contents of which are expressly incorporated by reference in their entirety, including any references contained therein.

TECHNICAL FIELD AND BACKGROUND

The present application pertains to an inventory tracking method.

The present application further pertains to an inventory tracking system.

The present application still further pertains to a record carrier comprising a computer program with instructions to enable a programmable device to perform the inventory tracking method.

Ultra High Frequency (UHF) radio-frequency identification (RFID) is a powerful technology for stock keeping as many items can be uniquely identified in a short period of time without having a direct line-of-sight. However, UHF RFID is not very powerful for determining the location of an item accurately. This makes accurate inventory tracking complicated as correctly recording a transition of an item, i.e. moving an item from one room to another, e.g. from a storage space to a shop, requires precise knowledge about its previous and current position. The same problem occurs when aiming to track goods that are taken out of the shop.

State-of-art localization techniques mostly rely on reading an item multiple times on different readers, antennas and/or antenna beams and determine the location based on comparing relative signal strengths. These approaches require a significant amount of complicated hardware. Furthermore, the UHF RFID reader will be very busy when many items are within reach, meaning that they might have limited amount of air time available to read an item often enough to be able to accurately locate the item. In addition, accurately registering a transition of a box of items will be virtually impossible.

SUMMARY OF THE INVENTION

It is an object of the present disclosure to provide an improved method and system that enables a rapid determining of a location of an UHF RFID tag. It is a further object of the present disclosure to provide a record carrier comprising a computer program with instructions to enable a programmable device to perform the improved inventory tracking method.

Accordingly, an improved inventory system is described that comprises a first inventory system unit and a second inventory system unit. The first inventory system unit comprises at least a configuration transmitter to generate a configuration field inside a first field zone to configure one or more UHF RFID tags within said first field zone into a configured state deviating from a default state. The second inventory system unit comprises at least an interrogation transceiver to generate an interrogation field inside a second field zone that is at least partly outside said first field zone to subsequently interrogate a set of one or more UHF RFID tags that are within said second field zone and that are in the configured state as a result of being configured by the configuration transmitter.

The act of configuring the one or more UHF RFID tags within the first field zone into a configured state merely requires broadcasting a configuration message with the configuration field. A configuration zone may be designated wherein the configuration field should have a sufficient power to configure each tag present therein, despite variations in the tag sensitivities and local effects like reflections and variations in tag orientation. It is not a problem that the configuration field may also be capable of configuring UHF RFID tags of items that are stored in the neighborhood of the intended configuration zone. As a single configuration message suffices for an arbitrarily large set of tags, the act of configuring UHF RFID tags of items that are being transported is not hampered by the presence of other RFID tags within the first field zone.

The act of interrogating UHF RFID tags in the second field zone incorporates a more complicated protocol, which involves a two-way communication between the configured UHF RFID tags and the interrogation transceiver. However, in this stage the number of UHF RFID tags to be interrogated is limited to those that are presently within the interrogation field after they were configured by the configuration field. As the interrogation field is inside a second field zone that is at least partly outside the first field zone, the number of UHF RFID tags to be interrogated includes only those that were recently displaced out of the first field zone. This number can be significantly lower than the number of UHF RFID tags configured in the first field zone. In this connection it is noted that the wording "recently" is related to the temporary persistence behavior of the state that was configured in the configuration zone. In case the configured state is the flag for session 0 or 1, the recently displaced tags are those that were present in the first field zone immediately before. In case the configured state is the flag for session 2 or 3, the recently displaced tags are those that were present in the first field zone at a point in time not longer ago than the persistence time of that flag.

It is noted that US 2010/289623 A1 discloses a method for interrogating RFID tags that includes transmitting an RF command signal to RFID tags in an inhibited zone during a first time period. The RF command signal substantially prevents the RFID tags in the inhibited zone from responding to RF interrogation. RFID tags in a target zone are interrogated during a second time period different from the first time period. The target zone located differently from the inhibited zone. In sharp contrast thereto according to the present approach, RFID tags in the first field zone are set into the configured state, so that being in that configured state they can be interrogated when entering the second field zone.

In some embodiments the improved inventory system is configured to operate according to the Electronic Product Code (EPC™) Radio-Frequency Identity Protocols Generation-2 UHF RFID (EPC UHF Gen2 Air Interface)—protocol. UHF RFID tags complying with this protocol are capable of being interrogated according to either one of four session types. Each session type has a dedicated inventoried flag, which may have a default state denoted as A and a deviating state denoted as B. The inventoried flag of a session type N will be denoted herein also as session N inventoried flag. In exemplary embodiments of the improved inventory system using tags according to the "EPC UHF Gen2 Air Interface" standard the configuration transmitter is configured to set the session N inventoried flag to B and the interrogation transceiver is configured to only interrogate the UHF RFID tags with inventoried flag set to B in the communication session of type N. Therewith N may be equal to 2 or 3. Both in session 2 and session 3 the inventoried flag persists in the state B at least during a predetermined time-interval after being set therein.

In some examples of these embodiments the interrogation transceiver is configured to receive an EPC backscattered by said at least one UHF RFID tag and to respond by transmitting to said at least one UHF RFID tag an invalid ACK (NAK), or by otherwise responding to the tag as if the EPC was not received, i.e. by responding with any command that is not Query, QueryRep or QueryAdjust). Normally, the reader upon receiving an EPC would start a new query. The tag would interpret any of the latter commands as an acknowledgement of the EPC and set the inventoried flag to its default state.

Upon receiving the NAK, or equivalent response, the UHF RFID tag maintains the reply state so that the interrogation transceiver can proceed its interrogation of the at least one UHF RFID tag.

In other examples of these embodiments the interrogation transceiver is configured to receive an EPC backscattered by said at least one UHF RFID tag and configured to refraining from a response to said at least one UHF RFID tag within the specified interrogator reply time. Similar to the case wherein a NAK is received, the UHF RFID tag returns to the arbitrate state so that the interrogation transceiver can proceed its interrogation of the at least one UHF RFID tag. The earlier mentioned examples wherein the interrogation transceiver is configured to transmit an invalid ACK is advantageous in that the interrogation transceiver can rapidly proceed with interrogating the at least one UHF RFID tag. The latter example, wherein the interrogation transceiver refrains from a response is somewhat easier to implement.

If the activation and interrogation fields are close enough, or partly overlapping, the tag will most likely remain fully powered during the transition. Once the tag is within the interrogation field, the latter continues to energize the tag. In that case the transmitter can configure the flag for any of the sessions 0,1,2,3, and that flag remains in the configured state so that the tag can be interrogated in the interrogation field.

In this connection it is noted that it is an advantage of the session 1 inventory flag (S1) that it always returns to the default state after at defined period of time, regardless whether or not it receives power from the RF field. So using S1 only the items passing from activation to detection with a characteristic time will be detected. This enforces a minimal velocity for the transition. This can be of an advantage in embodiments wherein the tagged articles are transported at a predetermined speed, e.g. by an automatic conveyor belt.

In other embodiments of the improved inventory system the configuration transmitter is configured to issue a Select command to at least one UHF RFID tag complying with the EPC UHF Gen2 Air Interface standard to assert the SL-flag of said UHF RFID tag, and the interrogation transceiver is configured to interrogate said tag. It is an advantage of these embodiments that the asserted state of the SL-flag is not affected when the tag is interrogated. Therewith the interrogation of a tag can at least proceed during the persistence time of the SL-flag. However, the time available is usually longer, as the presence of the interrogation field will be sufficient to keep the SL-flag in the configured state. In case the interrogation field partly overlaps the configuration field, the persistency of the SL-flag would be even superfluous.

In some embodiments of the improved inventory system comprising at least one UHF RFID tag complying with the EPC UHF Gen2 standard, the first inventory system unit comprises the configuration transmitter as part of a further interrogation transceiver. In some examples thereof, the first inventory system unit is configured to set the session M inventoried flag of the at least one UHF RFID tag to B and to interrogate the at least one UHF RFID tag if its session N inventoried flag is set to B. Additionally, the second inventory system unit is configured to set the session N inventoried flag of the at least one UHF RFID tag to B and to interrogate the at least one UHF RFID tag if its session M inventoried flag is set to B. This embodiment allows inventory tracking in both directions. Therein M,N indicate two mutually different types of session, selected from 0,1,2,3.

In other examples of embodiments wherein the configuration transmitter is part of a further interrogation transceiver the first inventory system unit is configured to set the session M inventoried flag of the at least one UHF RFID tag to B and to interrogate the at least one UHF RFID tag if its SL flag is set. Furthermore, the second inventory system unit is configured to set the SL flag of the at least one UHF RFID tag and to interrogate the at least one UHF RFID tag if its session M inventoried flag is set to B. Therein M indicates a session selected from 0,1,2,3.

Also in these embodiments, where a bidirectional inventorying takes place, it is advantageous if a reader upon receiving an EPC from a tag responds with a NAK, or otherwise causes the tag to proceed as if a NAK was received.

The invention is particularly suitable in a building comprising a first room, e.g. a storage area, a second room, e.g. a shopping area, and a wall between the first and the second room with a gate for allowing access between the rooms. In such application, the first field zone is at least partly within the first room and the second field zone is at least partly within the second room, so that any path from the first room to the second room via the gate extends through both the first and the second field zone. The gate may be provided with a door, which may be provided with a lock. In some examples thereof the inventory system is selectively activated when opening the door.

In some embodiments the gate comprises a corridor between said first room and said second room. In this way it can be achieved that the first and the second field zone are fully disjunct.

In other embodiments the invention is applied in a building, comprising an interior enclosed by a wall, e.g. a shopping area, and an exterior outside the wall, and a gate provided to allow access between the interior and the exterior. In such application, the first field zone is at least partly within the interior and the second field zone is at least partly in the exterior or in a corridor giving leading from the gate to the exterior. Therewith any path from the interior to the exterior will go through both the first and the second field zone. The gate may be provided with a door, which may be provided with a lock. In some examples thereof the inventory system is selectively activated when opening the door.

In some embodiments the first and the second inventory system unit may have their proper housing, so that for example one of the units can be accommodated in a first room or an interior of the building and the other one can be accommodated in a second room or in the exterior of the building. In other embodiments, the first and the second inventory system unit of the inventory system are accommodated in a common housing. In examples of these other embodiments, the first and the second inventory system unit may be provided on one or more common printed circuit boards. Integrating both system units in this way is advantageous in that use of cables can be avoided as much as possible, therewith mitigating the risk of electromagnetic interference. In some of these examples the first and the second inventory system units may share common electronic components, such as a power supply. Also in some examples certain components may be time-multiplexed. For example a common oscillator may be provided that alternately serves to provide the carrier wave to render the configuration field and to render the interrogation field.

BRIEF DESCRIPTION OF THE DRAWINGS

These and other aspects of the present invention are described in more detail with reference to the drawings. Therein.

DETAILED DESCRIPTION

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

Figure 1:
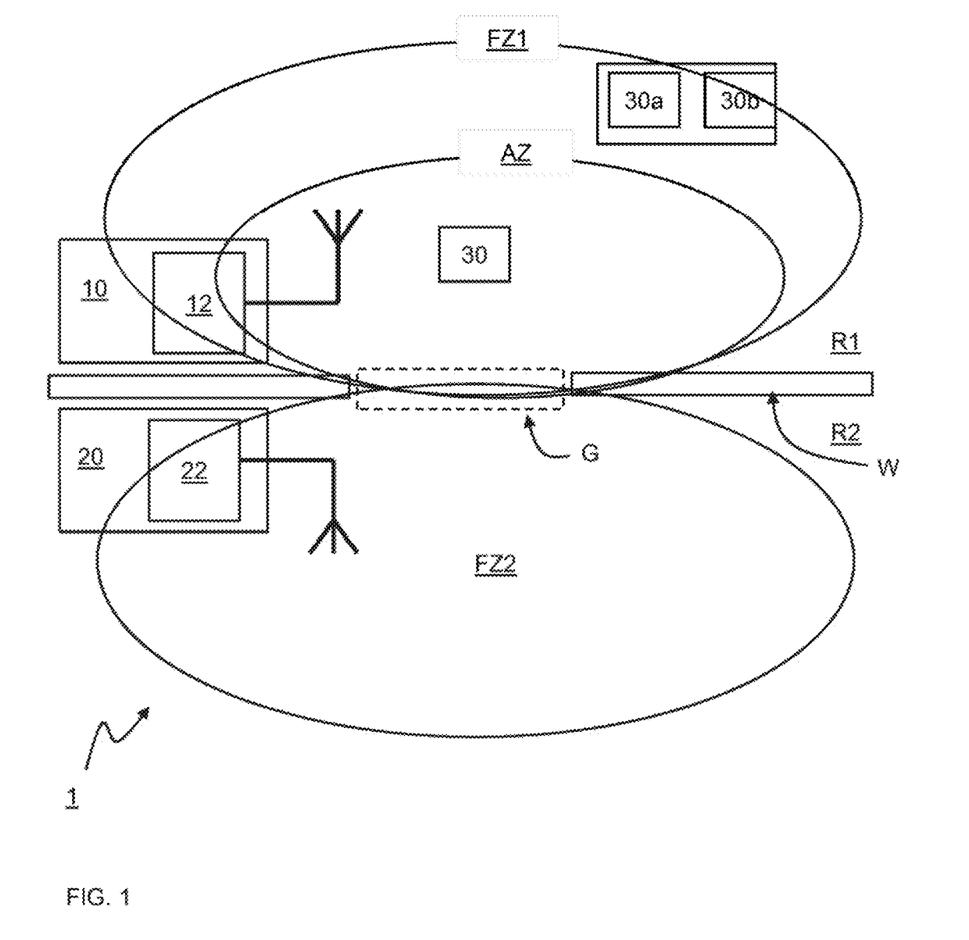
FIG. 1 schematically shows a portion of a building having arranged therein an embodiment of the inventory system.

FIG. 1 schematically shows a portion of a building that comprises a first room R1, a second room R2, and a wall W between the rooms R1, R2 that has a gate G for allowing access between the rooms. In the example shown, the gate G may be a free passageway. The building is provided with an inventory system 1 that comprises a first inventory system unit 10 and a second inventory system unit 20. The first inventory system unit 10 comprises at least a configuration transmitter 12 accommodated in the first room R1 to generate a configuration field inside a first field zone FZ1 that is at least partly within the first room R1. The configuration field is at least strong enough to configure tags 30 that are in a configuration zone AZ in the immediate neighborhood of the gate G regardless local effects such as reflections, the orientation and the sensitivity of the tag. As a side effect, it may also configure more remote tags that are farther away of the gate, but not in the configuration zone. This is not a problem, as the configuration field merely serves to broadcast a configuration message, which can take place in a predetermined time-interval, irrespective the number of tags to be configured. The one or more UHF RFID tags 30, 30a, 30b that have received the activation message assume a configured state deviating from a default state.

Figure 2:
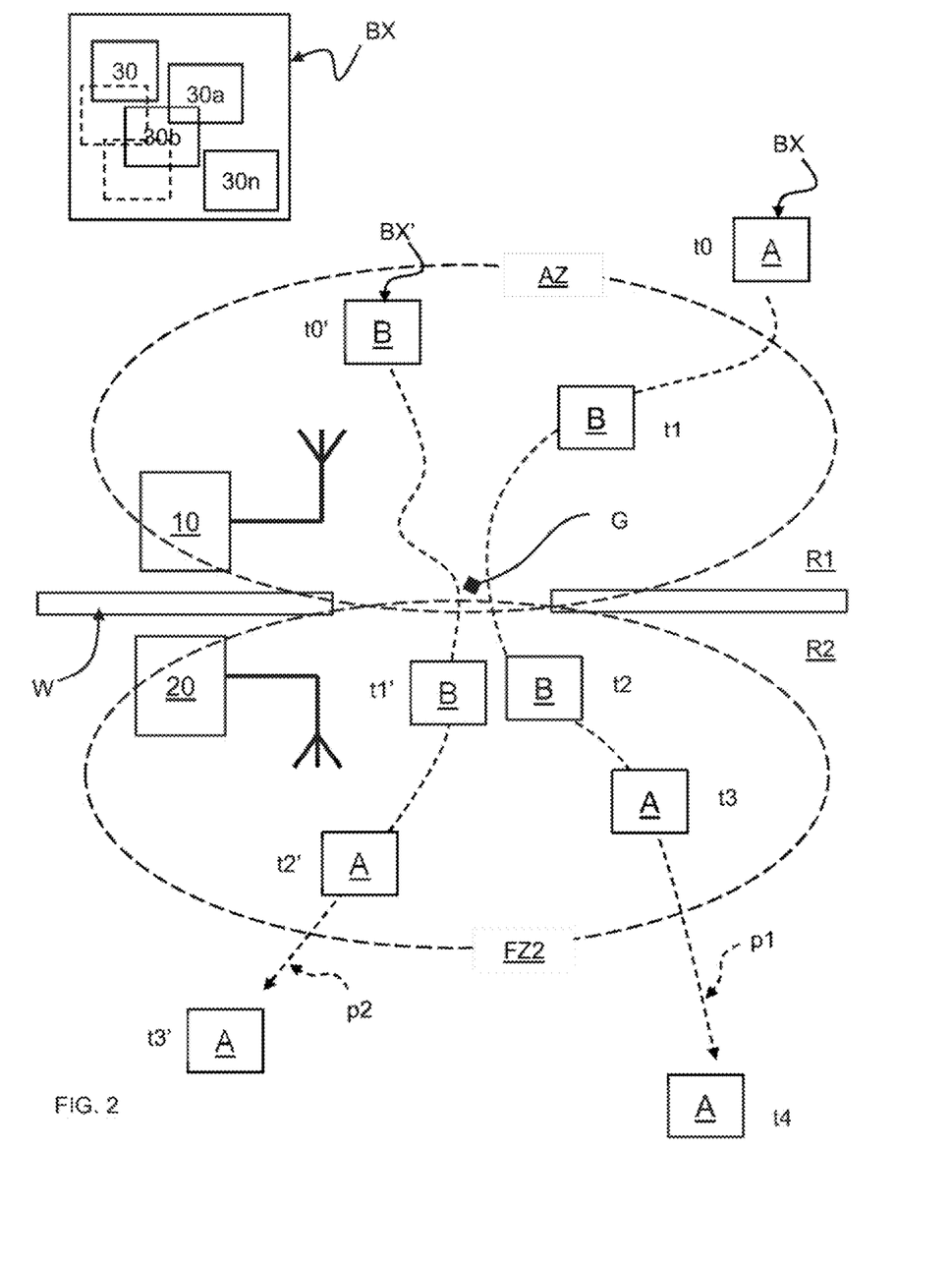
FIG. 2 shows a process of inventorying UHF-RFID tags with the embodiment of the inventory system of FIG. 1.

An operation of the system is demonstrated in FIG. 2. By way of example, at a point in time t0, a box BX provided with articles is transported along a path p1 into the configuration zone AZ, which may be a sub area of a larger first field zone. As shown in the top left corner of FIG. 2, the articles in the box BX are tagged with respective UHF RFID tags 30, 30a, 30b, . . . , 30n, in this example UHF RFID tag complying with the EPC UHF Gen2 Air Interface standard. At point in time t0, the tags have a default state, denoted as A. After having entered the configuration zone AZ, the configuration field of the first inventory system unit 10 causes the tag at a point in time t1 to assume the configured state, here denoted as B. At a point in time t2, when further continuing along the path p1, the box BX enters the second field zone FZ2 in the second room R2, in which the second inventory system unit 20 generates an interrogation field. Inside the second field zone FZ2 that is at least partly outside the first field zone FZ1 the second inventory system unit 20 subsequently interrogates the set of one or more UHF RFID tags 30, 30a, . . . , 30n that are present in the box BX and that were configured by first inventory system unit 10 into the configured state. Subsequent to interrogation at a point in time t3, the one or more UHF RFID tags 30, 30a, . . . , 30n may return to their default state. FIG. 2 shows that the box BX is transported further along the path p1 at a point in time t4.

In some cases a box or an article to be transported to the second room R2, may already be present at a location where the configuration field is strong enough to configure the tags. This is schematically shown for a box BX', which is to be transported to the second room R2 along a path p2. Similar as in the case of the box BX, the configured tags present in the box BX' are interrogated by the second inventory system unit 20 when they enter the second field zone FZ2 at a point in time t1'.

Figure 3:
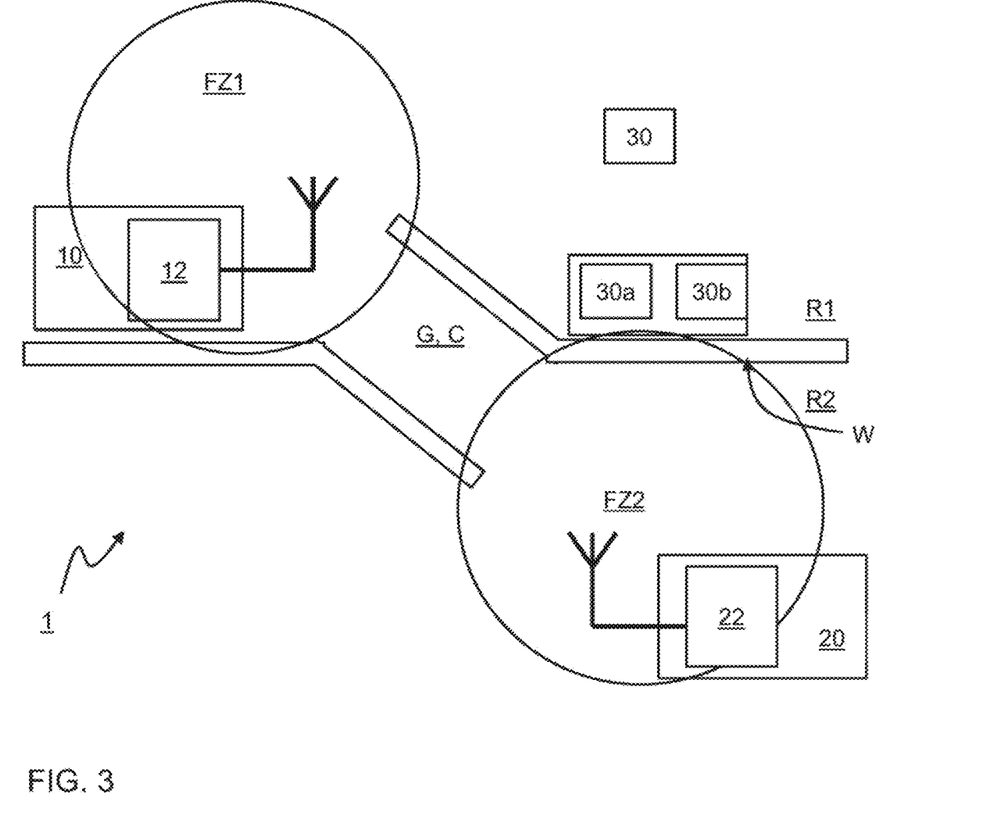
FIG. 3 shows another example of using an embodiment of the inventory system in a building.

FIG. 3 shows an alternative arrangement of a building, wherein the gate G comprises a corridor C between the first room R1 and the second room R2.

Figure 4:
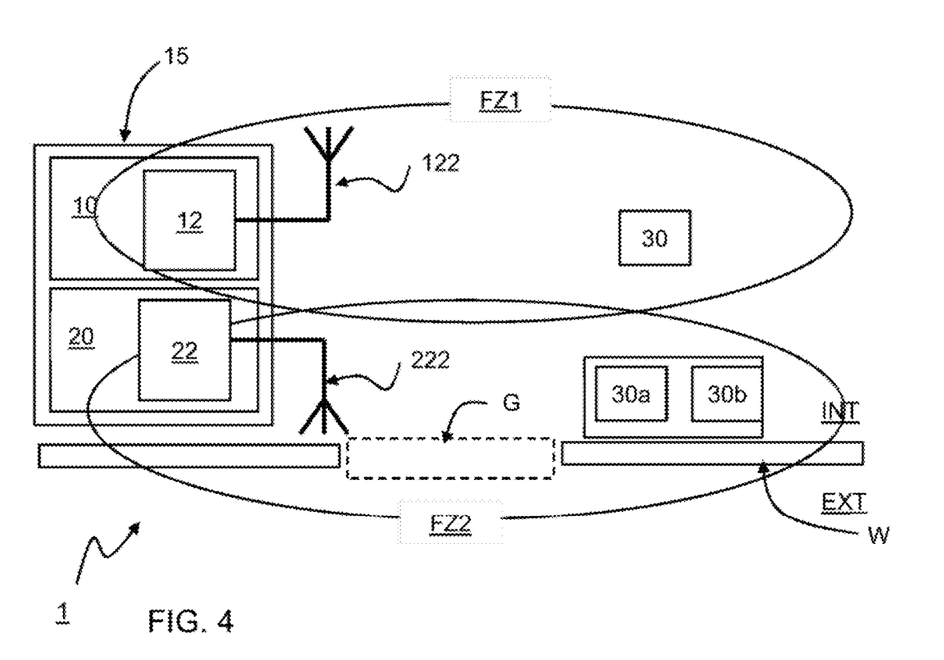
FIG. 4 shows a still further example of using an embodiment of the inventory system in a building.

FIG. 4 shows a still further arrangement of a building. In this arrangement the building comprises a wall W that encloses an interior INT, such a shopping area. The wall W has a gate G to provide access to an exterior EXT such as a shopping street, or other common space. As shown in FIG. 4, the first field zone FZ1 is at least partly within the interior INT and the second field zone FZ2 is at least partly in the exterior EXT or in a corridor giving access to the exterior, so that any path from the interior to the exterior via the gate extends through both the first and the second field zone. Therewith the inventory system 1 is configured to detect tagged goods that are taken outside the building without authorization.

It is further noted that in the embodiment of FIG. 4, the first and the second inventory system unit 10, 20, are accommodated in a common housing 15, which is accommodated inside the building.

Figure 5:
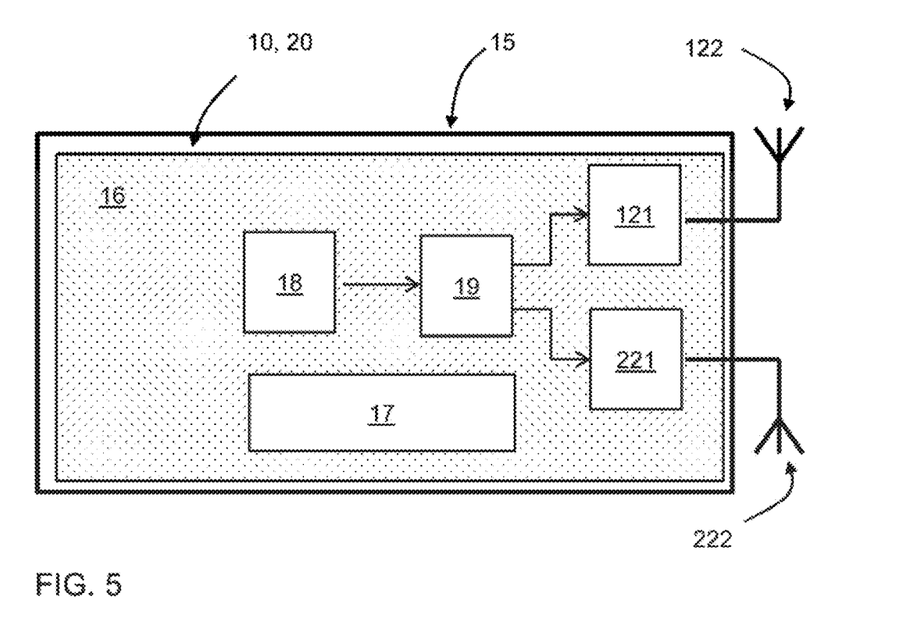
FIG. 5 schematically shows an embodiment of the inventory system having a mutually integrated first and second inventory system unit.

FIG. 5 shows a particular example thereof wherein the first and the second inventory system unit are provided on one or more common printed circuit boards 16. Moreover, the first and the second inventory system units 10, 20 share common electronic components, such as a power supply 17. Also certain components are time-multiplexed. For example a common oscillator 18 is provided that alternately serves to provide the carrier wave to render the configuration field and to render the interrogation field. To that end a switch module 19 is provided that alternately provides the output signal of the common oscillator 18 to a first output module 121, that serves to render the configuration field, and to a second output module 221, that serves to render the interrogation field.

Figure 6:
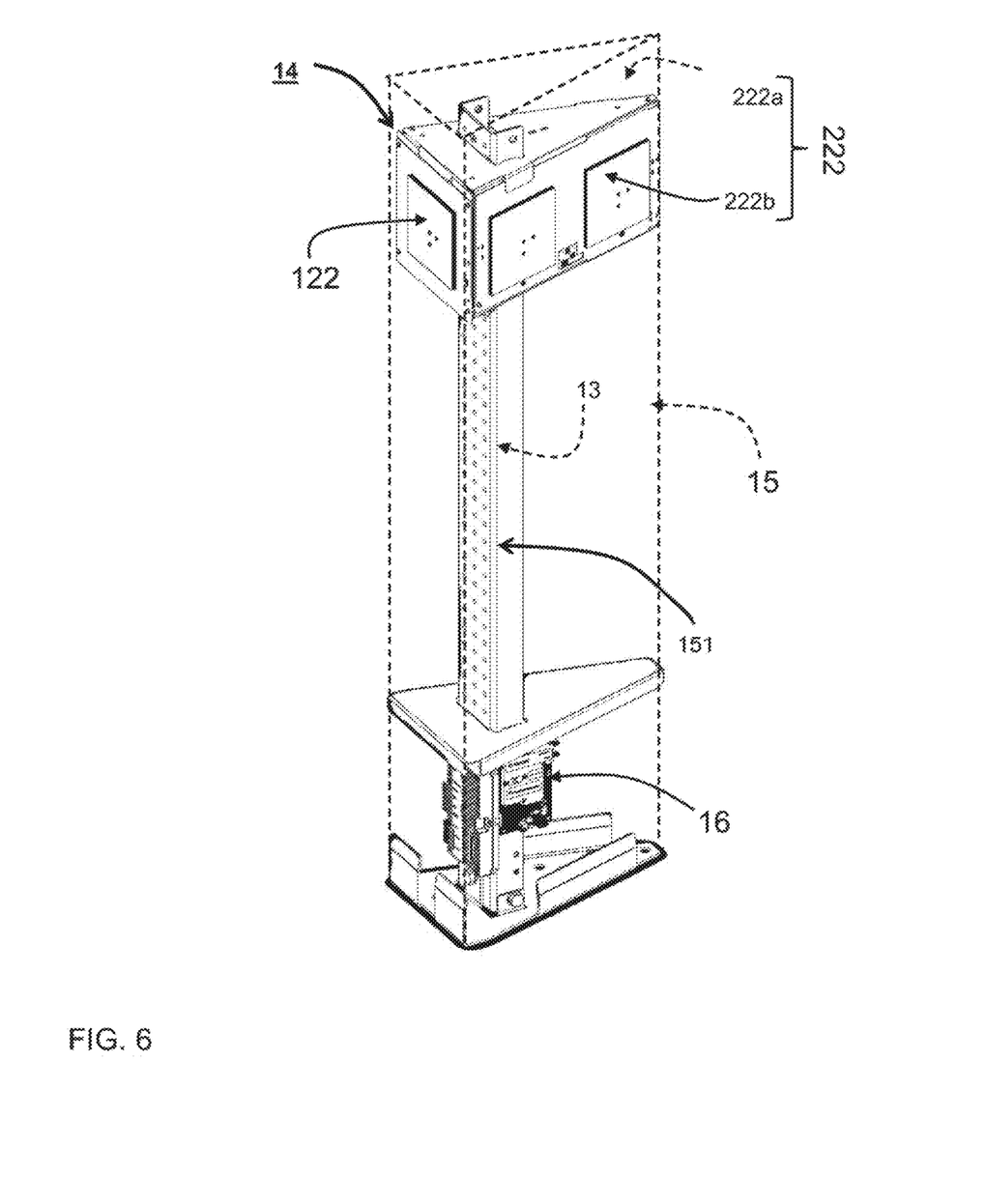
FIG. 6 shows a practical implementation of the embodiment of the inventory system of FIG. 5.

FIG. 6 shows a practical embodiment of the inventory system 1. In the example shown in FIG. 6, the inventory system 1 comprises a support 151 that carries the printed circuit board 16 with the electronic components of the system units and a wedge shaped antenna carrier 14 that carries the antennas 122, 222. electrically coupled to the system units by a flexible connection 13. More in particular, it is shown that the antenna 122 of the first inventory system unit comprises a single element on a short side of the wedge shaped antenna carrier 14, while the antenna 222 of the second inventory system unit comprises a respective antenna module 222a, 222b on each long side thereof. On the right side of the support 151, the housing 15 is shown, in which the support 151 with the components assembled therewith is accommodated.

Figure 7:
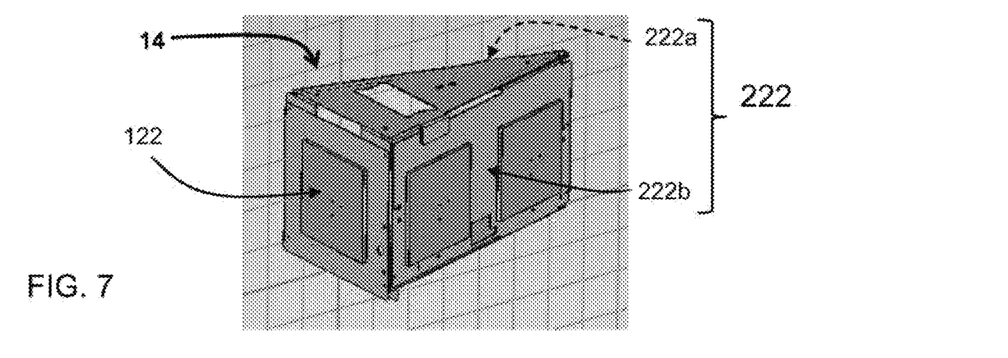
FIG. 7 shows a component of the practical implementation of FIG. 6 in more detail.
Figure 7A:
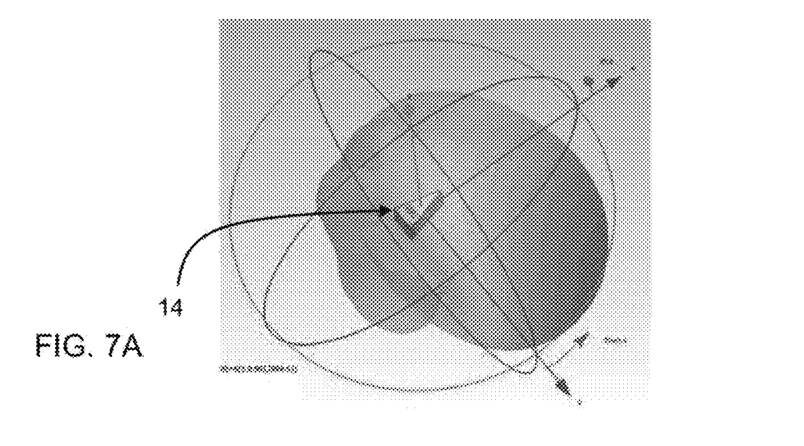
FIGS. 7A and 7B respectively show a first field zone and a second field zone.
Figure 7B:
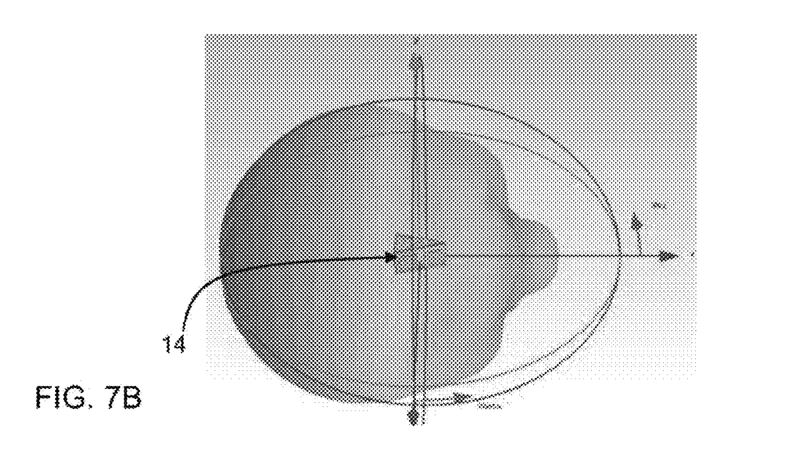

FIG. 7 schematically shows wedge shaped antenna carrier 14 that carries the antennas 122, and 222, the latter with antenna modules 222a, 222b. FIG. 7A shows the power distribution of the interrogation field rendered with the antenna modules 222a, 222b of the antenna 222. Due to the fact that each antenna module has a pair of antenna plates, a focused beam is provided at each side of the antenna carrier 14. FIG. 7B shows the power distribution of the configuration field rendered with the antenna 122. Therewith a broad beam is generated at the side of the short side of the wedge shaped antenna carrier 14.

Figure 8:
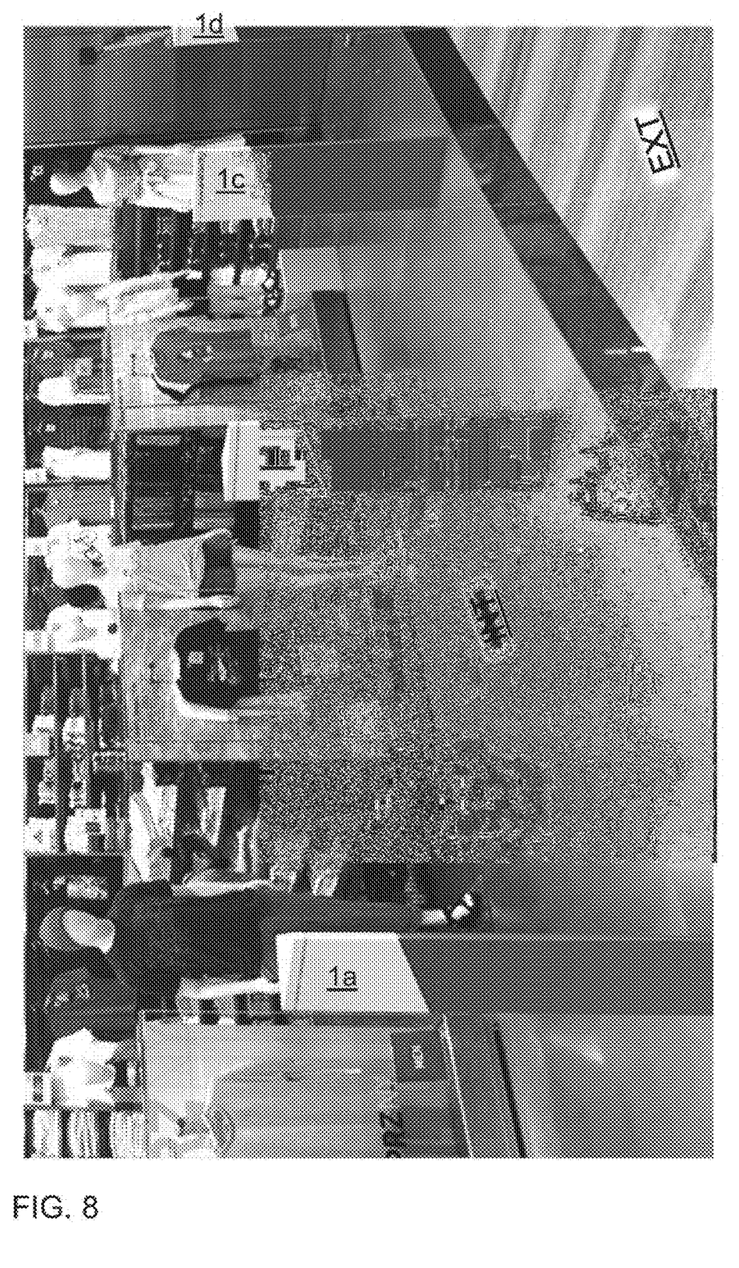
FIG. 8 shows an exemplary arrangement of specimen of the inventory system at the exit of a shop.

FIG. 8 shows an exemplary arrangement of species 1a, 1b, 1c, 1d of the inventory system arranged at the exit of a shop. With this arrangement it is achieved that a relatively broad passageway can be monitored. The inventory systems 1a, 1b, 1c, 1d cooperate to provide for a configuration field extending over an area inside the shop extending over the full width of the passageway, and are configured to render an interrogation field between each pair 1a-1b; 1b-1c; 1c-1d of inventory systems.

In summary, the present disclosure provides improved approaches to inventory one or more UHF RFID tags. The method is improved in that an interrogation overhead resulting from neighboring tags is at least substantially reduced. An inventory tracking method as disclosed herein comprises generating a configuration field inside a first field zone to configure one or more UHF RFID tags within the first field zone into a configured state deviating from a default state. For this purpose it is sufficient to use a first inventory system unit that is merely configured to transmit a configuration command, as described for example with reference to FIG. 1. Alternatively however, the first inventory system unit 10 may be a fully functional RFID reader unit. Various options are available to configure the tags in the configuration field. For example for UHF RFID tags complying with the EPC UHF Gen2 Air Interface standard one option is to set the inventory flag for one of the sessions 0, 1, 2, 3 to B. Another option is to set their SL flag. An interrogation field is generated inside a second field zone that is at least partly outside said first field zone to subsequently interrogate the set of one or more UHF RFID tags within said second field zone that were configured by the configuration field into the configured state. Dependent on the particular application a most appropriate way of configuring may be selected. For example in case the configuration field and the interrogation field overlap each other in the path from the first to the second room, or from the interior to the exterior, it is guaranteed that the tags are continuously energized when moving along the path. In that case any session flag or the SL flag could be used for configuration. However, in case there is no overlap, a flag having a minimally guaranteed persistence time can be used, such as the inventory flag for the sessions of type 2 or 3, or the SL flag. Using the SL flag is additionally advantageous in that it does not return automatically to its default state after interrogation of the tag. Therewith interrogation by the second inventory system unit can be repeated to better localize the tag if desired. This advantage can also be used when the inventory flag of one of the sessions is used, provided that the second inventory system unit receiving an EPC response from the tag does not acknowledge that response, for example by explicitly transmitting a not acknowledge message or by transmitting any command other than a Query, QueryRep or QueryAdjust.

As noted, in some embodiments, the first inventory system unit is a fully functional RFID reader unit. This renders in possible to inventory in both directions. For inventory systems cooperating with UHF RFID tags complying with the EPC UHF Gen2 standard it is one option that the first inventory system unit is configured to set the session M inventoried flag of the UHF RFID tag within its configuration field to B and to interrogate UHF RFID tag with their session N inventoried flag to B within its interrogation field. Reversely, the second inventory system unit 20 therein is configured to set the session N inventoried flag of an UHF RFID tag in its configuration field to B and to interrogate UHF RFID tags with a session M inventoried flag set to B that are within its interrogation field. It is another option that the first inventory system unit is configured to set the session M inventoried flag of the UHF RFID tag within its configuration field to B and to interrogate UHF RFID tags with an asserted SL flag within its interrogation field. Reversely, the second inventory system unit 20 therein is configured to set the SL-flag of an UHF RFID tag in its configuration field in an asserted state and to interrogate UHF RFID tags with a session M inventoried flag set to B that are within its interrogation field. The integers M, N indicate the session type 0,1, 2 or 3, and should be mutually different.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

What is claimed is:

1. An inventory system comprising:
a first inventory system unit; and
a second inventory system unit,
wherein the first inventory system unit comprises at least a configuration transmitter configured to generate a configuration field with sufficient power inside a first field zone to issue a Select command to assert an SL flag of one or more Ultra High Frequency (UHF) radio-frequency identification (RFID) tags within the first field zone, and
wherein the second inventory system unit comprises at least an interrogation transceiver configured to generate an interrogation field inside a second field zone that is at least partly outside the first field zone to subsequently interrogate a set of one or more UHF RFID tags that are both:
within the second field zone, and
have an asserted SL flag as a result of having received the Select command issued by the configuration transmitter.

2. The inventory system according to claim 1, wherein the first and the second inventory system unit are accommodated in a same housing.

3. The inventory system according to claim 2, wherein the first and the second inventory system unit are provided on a same printed circuit board.

4. The inventory system according to claim 1,
wherein the first inventory system unit comprises the configuration transmitter as part of a further interrogation transceiver,
wherein the second inventory system unit is further configured to
set a session M inventoried flag of the at least one UHF RFID tag to B; and
wherein the first inventory system unit is further configured to interrogate the at least one UHF RFID tag having the session M inventoried flag that is set to B.

5. The inventory system according to claim 4, wherein the configuration field of the first inventory system overlaps the interrogation field of the second inventory system unit.

6. A building comprising:
an inventory system comprising:
a first inventory system unit; and
a second inventory system unit,
wherein the first inventory system unit comprises at least a configuration transmitter configured to generate a configuration field with sufficient power inside a first field zone to issue a Select command to assert an SL flag of one or more Ultra High Frequency (UHF) radio-frequency identification (RFID) tags within the first field zone, and
wherein the second inventory system unit comprises at least an interrogation transceiver configured to generate an interrogation field inside a second field zone that is at least partly outside the first field zone to subsequently interrogate a set of one or more UHF RFID tags that are both:
within the second field zone, and
have an asserted SL flag as a result of having received the Select command issued by the configuration transmitter; and
a wall enclosing an interior, the wall having a gate providing access to an exterior,
wherein the first field zone is at least partly within the interior,
wherein the second field zone is at least partly in the exterior or in a corridor giving access to the exterior, and
wherein a path from the interior to the exterior via the gate extends through both the first field zone and the second field zone.

7. The building according to claim 6, further comprising a passageway between a first room and a second room or between an interior and an exterior, and wherein the inventory system, is one of a plurality of specimen of the inventory system, the specimen being distributed along a width of the passageway, wherein the specimen of the inventory systems cooperate to provide for a configuration field extending over an area in the interior or in the first room extending over the full width of the passageway, and are configured to render an interrogation field between each pair of the specimen.

8. A building comprising:
a first room,
a second room,
a wall between the first room and the second room with a gate for allowing access between the rooms, and
an inventory system comprising:
a first inventory system unit; and
a second inventory system unit,
wherein the first inventory system unit comprises at least a configuration transmitter configured to generate a configuration field with sufficient power inside a first field zone to issue a Select command to assert an SL flag of one or more Ultra High Frequency (UHF) radio-frequency identification (RFID) tags within the first field zone, and
wherein the second inventory system unit comprises at least an interrogation transceiver configured to generate an interrogation field inside a second field zone that is at least partly outside the first field zone to subsequently interrogate a set of one or more UHF RFID tags that are both:
within the second field zone, and
have an asserted SL flag as a result of having received the Select command issued by the configuration transmitter;
wherein the first field zone is at least partly within the first room,
wherein the second field zone is at least partly within the second room, and
wherein a path from the first room to the second room via the gate extends through both the first and the second field zone.

9. The building according to claim 8, wherein the gate comprises a corridor between the first room and the second room.

10. The building according to claim 8,
wherein the first inventory system unit comprises the configuration transmitter as part of a further interrogation transceiver,
wherein the second inventory system unit is further configured to set a session M inventoried flag of the at least one UHF RFID tag to B; and
wherein the first inventory system unit is further configured to: interrogate the at least one UHF RFID tag having the session M inventoried flag that is set to B.

11. An inventory tracking method using one or more Ultra High Frequency (UHF) radio-frequency identification (RFID) tags, the method comprising:
generating a configuration field with sufficient power inside a first field zone to issue a Select command to assert an SL flag of the one or more UHF RFID tags within the first field zone, and
generating an interrogation field inside a second field zone that is at least partly outside the first field zone to subsequently interrogate a set of one or more UHF RFID tags that are within the second field zone and that have an asserted SL flag as a result of having received the Select command issued during the generating a configuration field.

12. A record carrier comprising a non-transitory computer-readable medium including a computer program with computer program instructions that, when executed by a programmable device, facilitate performing the method of claim 11.

13. The inventory tracking method according to claim 11, wherein the configuration field of the first inventory system overlaps the interrogation field.

14. A bidirectional inventory system comprising:
a first inventory system unit; and
a second inventory system unit;
wherein the first inventory system unit and the second inventory system unit each comprise at least a configuration interrogation transceiver configured to generate a configuration field with sufficient power inside a first field zone and a second field zone respectively to therewith broadcast a configuration message,
wherein one or more Ultra High Frequency (UHF) radio-frequency identification (RFID) tags within the first field zone are able to correctly receive the configuration message and as a result transition into a first configured state deviating from a default state wherein their session M inventoried flag is set to B, and wherein at least one of the one or more Ultra High Frequency (UHF) radio-frequency identification (RFID) tags within the second field zone are able to correctly receive the configuration message and as a result transition into a second configured state deviating from a default state wherein their session N inventoried flag is set to B,
wherein the first inventory system unit is further configured to interrogate the at least one UHF RFID tag having a session N inventoried flag that is set to B; and
wherein the second inventory system unit is further configured to interrogate the at least one UHF RFID tag having the session M inventoried flag that is set to B.

15. The inventory system according to claim 14, wherein an interrogation field of the first inventory system overlaps the configuration field of the second inventory system unit, and wherein an interrogation field of the second inventory system overlaps the configuration field of the first inventory system unit.

16. The inventory system according to claim 14, wherein the first and the second inventory system unit are accommodated in a same housing.

17. The inventory system according to claim 16, wherein the first and the second inventory system unit are provided on a same printed circuit board.

18. The inventory system according to claim 16, comprising a wedge shaped antenna carrier having a short side and a pair of long sides, wherein the short side of the antenna carrier carries an antenna of the first inventory system unit and wherein the long sides each carry a respective antenna module of an antenna of the second inventory system unit.

19. A building comprising:
a first room;
a second room;
a wall between the first room and the second room with a gate for allowing access between the rooms; and
a bidirectional inventory system comprising:
a first inventory system unit; and
a second inventory system unit;
wherein the first inventory system unit and the second inventory system unit each comprise at least a configuration interrogation transceiver configured to generate a configuration field with sufficient power inside a first field zone and a second field zone respectively to therewith broadcast a configuration message,
wherein one or more Ultra High Frequency (UHF) radio-frequency identification (RFID) tags within the first field zone are able to correctly receive the configuration message and as a result transition into a first configured state deviating from a default state wherein their session M inventoried flag is set to B, and wherein one or more Ultra High Frequency (UHF) radio-frequency identification (RFID) tags within the second field zone are able to correctly receive the configuration message and as a result transition into a second configured state deviating from a default state wherein their session N inventoried flag is set to B,
wherein the first inventory system unit is further configured to interrogate the at least one UHF RFID tag having a session N inventoried flag that is set to B; and
wherein the second inventory system unit is further configured to interrogate the at least one UHF RFID tag having the session M inventoried flag that is set to B;
wherein the first field zone is at least partly within the first room,
wherein the second field zone is at least partly within the second room, and
wherein a path from the first room to the second room via the gate extends through both the first and the second field zone.

* * * * *